United States Patent
Chan

(10) Patent No.: US 9,608,857 B2
(45) Date of Patent: Mar. 28, 2017

(54) METHOD AND APPARATUS FOR PROVIDING ALARMS IN NETWORKS

(71) Applicant: Coriant Operations, Inc., Naperville, IL (US)

(72) Inventor: Eric L. Chan, Naperville, IL (US)

(73) Assignee: Coriant Operations, Inc., Naperville, IL (US)

( * ) Notice: Subject to any disclaimer, the term of this patent is extended or adjusted under 35 U.S.C. 154(b) by 358 days.

(21) Appl. No.: 13/953,289

(22) Filed: Jul. 29, 2013

(65) Prior Publication Data

US 2015/0032834 A1     Jan. 29, 2015

(51) Int. Cl.
*H04L 12/24*     (2006.01)
*H04L 12/26*     (2006.01)

(52) U.S. Cl.
CPC ...... *H04L 41/0613* (2013.01); *H04L 41/0604* (2013.01); *H04L 41/082* (2013.01); *H04L 41/0866* (2013.01); *H04L 41/5074* (2013.01); *H04L 43/0811* (2013.01); *H04L 43/0817* (2013.01)

(58) Field of Classification Search
CPC ..... H04L 41/046; H04L 41/06; H04L 41/604; H04L 41/00; H04L 43/00; H04L 51/00; H04L 61/00; H04L 65/00; H04L 67/00; H04L 69/00; H04L 41/0613; H04L 41/0604; H04L 41/082; H04L 41/0866; H04L 41/5074; H04L 43/0811; H04L 43/0817; H04L 12/423; H04L 67/1051; H04L 67/025; H04L 67/125; G05B 2219/31083
See application file for complete search history.

(56) References Cited

U.S. PATENT DOCUMENTS

| | | | |
|---|---|---|---|
| 2005/0169317 A1* | 8/2005 | Pruecklmayer | H04L 12/64 370/498 |
| 2007/0204068 A1* | 8/2007 | Oku et al. | 709/251 |
| 2008/0266127 A1* | 10/2008 | Bajpay | G01R 31/088 340/650 |
| 2010/0103823 A1* | 4/2010 | Goerge | H04L 41/044 370/242 |
| 2012/0246297 A1* | 9/2012 | Shanker | H04L 67/2842 709/224 |
| 2012/0254652 A1* | 10/2012 | Katiyar | H04L 41/0695 714/4.1 |
| 2012/0320737 A1* | 12/2012 | Assarpour | 370/218 |

(Continued)

OTHER PUBLICATIONS http://en.wikipedia.org/wiki/Transaction_Language_1[Jul. 1, 2013 3:20:26 PM ], Transaction Language, downloaded from worldwide web on Jul. 1, 2013.

*Primary Examiner* — Wing F Chan
*Assistant Examiner* — Billy H Ng
(74) *Attorney, Agent, or Firm* — Hamilton, Brook, Smith & Reynolds, P.C.

(57) ABSTRACT

Multiple physical NEs may be presented to a network carrier as a single logical NE comprising multiple physical NEs. Alarms between the multiple physical NEs may be treated as internal connection alarms of the single logical NE instead of endpoint alarms of the multiple physical NEs. A number of alarms in the network may be reduced as well as alarm processing of the alarms at an Operational Support System (OSS), effectuating scaling of alarms as well as relaxing resource requirements (e.g., compute power, memory, etc.) of the OSS.

20 Claims, 10 Drawing Sheets

(56) References Cited

U.S. PATENT DOCUMENTS

| | | | |
|---|---|---|---|
| 2013/0073711 A1* | 3/2013 | Hanka | H04L 45/58 709/223 |
| 2014/0036663 A1* | 2/2014 | Narayanan | H04L 45/125 370/230 |
| 2014/0146662 A1* | 5/2014 | Okabe | H04L 41/0686 370/225 |
| 2014/0204726 A1* | 7/2014 | Nagasawa | 370/216 |

* cited by examiner

METHOD AND APPARATUS FOR PROVIDING ALARMS IN NETWORKS

BACKGROUND OF THE INVENTION

Transaction Language 1 (TL1) is a widely used management protocol in telecommunications. TL1 is a cross-vendor, cross-technology, man-machine language, and is widely used to manage optical (SONET) and broadband access infrastructure in North America. TL1 may be used in input and output messages that pass between Operations Support Systems (OSSs) and Network Elements (NEs). NE vendors may implement TL1 in their devices to communicate with OSSs.

SUMMARY OF THE INVENTION

Embodiments of the present invention provide a method, apparatus, computer program product, and corresponding system for providing alarms in a network.

According to one embodiment, a method may generate (i) internal connection alarms for a virtual node at master ports of pairs of master and slave ports of nodes configured to appear as the virtual node and (ii) endpoint alarms at ports of the nodes not being within a master and slave pairing. Master and slave ports may operate in accordance with an internal connection mode. Ports of the nodes not being within the master and slave port pairing may operate in accordance with a normal connection mode.

Another example embodiment disclosed herein includes an apparatus (also referred to herein as a node) corresponding to operations consistent with the method embodiments disclosed herein.

Further, yet another example embodiment may include a non-transitory computer-readable medium having stored thereon a sequence of instructions which, when loaded and executed by a processor, causes the processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
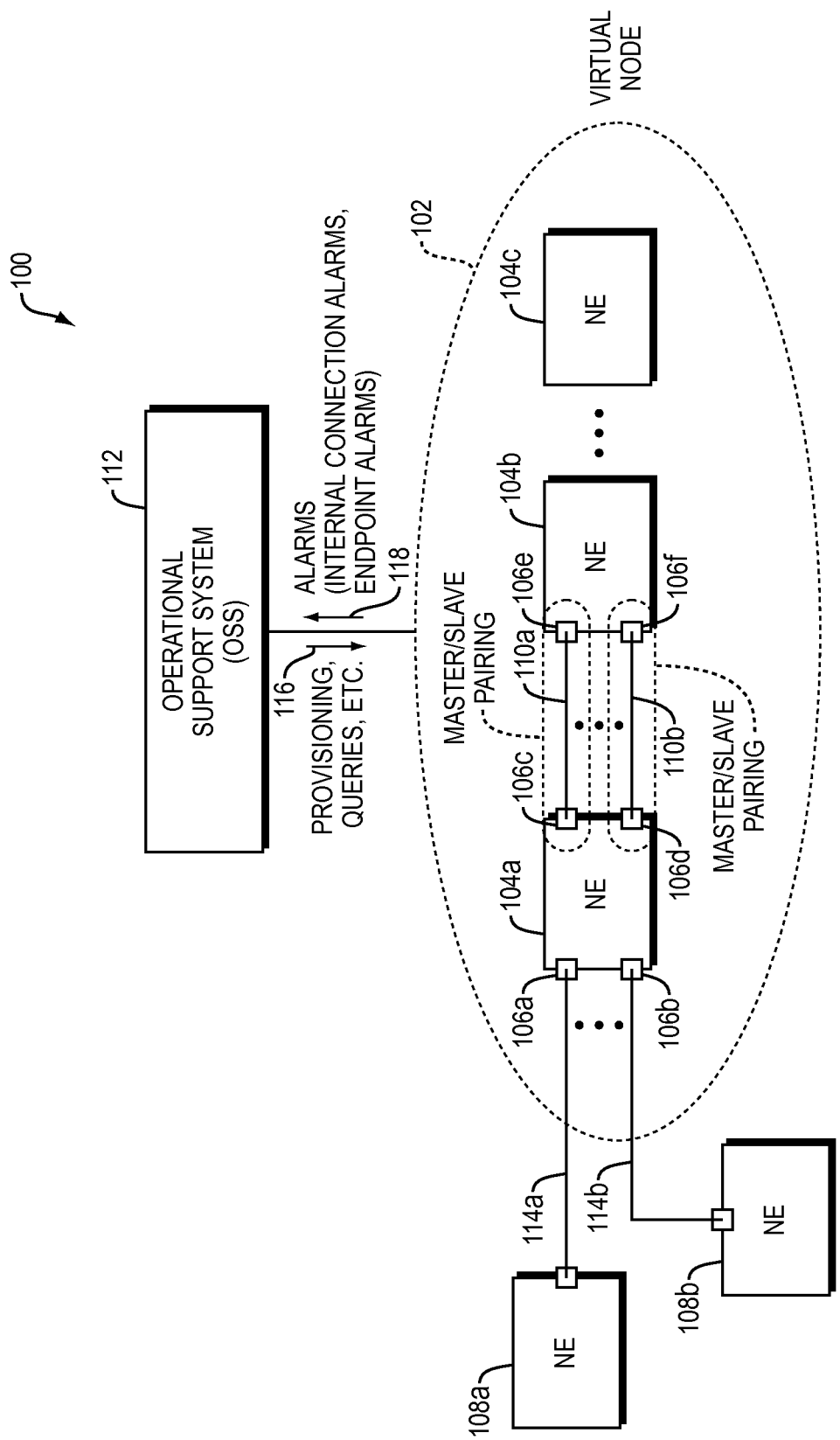
FIG. 1A is block diagram of a virtual node in operative communication with an Operational Support System (OSS) and second nodes.

A description of example embodiments of the invention follows.

Operational support systems, also referred to herein as an operations support system (OSS), network management system (NMS), or network management platform, may be computer systems used by telecommunications service providers, also referred to herein as network carriers. Operational support systems may deal with a network, such as a telecom, datacom, or other suitable network, and supporting processes, such as maintaining network inventory, provisioning services, configuring network components, and managing alarms (e.g., alarms indicating faults in the network).

In an operational network environment, such as a telecom, datacom, or other suitable network environment, each alarm, such as an indication of a fault or quality degradation, may be handled (i.e., investigated and corrected) by engineers, such as network operations center (NOC) engineers. For example, each time a fault condition in the network environment is detected, an alarm may be generated and communicated to a network management platform, such as an OSS in the network environment. Typically, a "trouble ticket" may be generated and associated with the alarm. The ticket may be assigned to a NOC engineer responsible for identifying a root cause and resolving the alarm.

Reducing a number of trouble tickets may relieve complexity for the NOC engineers responsible for resolving the alarms associated with the trouble tickets. Embodiments disclosed herein may reduce a number of alarms being generated, thereby reducing a number of messages being communicated to the OSS, as well as a number of trouble tickets being generated. In addition, embodiments disclosed herein may reduce alarm processing of the alarms at the OSS. As such, embodiments disclosed herein may effectuate scaling of the alarms and may relax resource requirements, such as compute power, memory, etc., of the OSS.

Embodiments disclosed herein may provide alarms in networks, such as telecom networks and datacom networks, or any other suitable network. According to embodiments disclosed herein, multiple physical network elements (NEs), also referred to herein as nodes, may be presented as a virtual node (also referred to herein as a single logical NE) comprising the multiple physical NEs. Embodiments disclosed herein may generate internal connection alarms, for the virtual node, at master ports of pairs of master and slave ports of the nodes configured to appear as the virtual node.

A fault condition, such as a faulty cable, misconfigured cable, misconfigured port, etc., may trigger multiple alarms. For example, a faulty cable operatively coupling two physical ports of two separate NEs may trigger alarms raised on both ports of both NEs. Instead of alarming each physical or virtual port of a physical NE having an alarm condition, embodiments disclosed herein may collate and integrate alarm conditions, by presenting the alarm conditions collated and integrated as a single internal connection alarm of a virtual node. Embodiments disclosed herein may generate internal connection alarms, for the virtual node, at master ports of pairs of master and slave ports of the nodes configured to appear as the virtual node thereby reducing a number of alarms. Alarm conditions may be any suitable alarm conditions, such as alarm conditions associated with Ethernet, SONET, SDH, Ethernet over SONET (EOS) ports, etc. Alarm conditions may include alarm indication signal path (AIS-P), alarm indication signal line (AIS-L), remote defect indication (RDI), loss of signal (LOS), remote alarm indication (RAI), link failure (LF), or any other suitable alarm condition. Alarm conditions may be due to hardware malfunction, software malfunction, hardware misconfiguration, software misconfiguration, or any other suitable source, or combination thereof.

A current approach to alarm management in complex networks is to have one physical NE designated as a master and all alarms from other physical NEs communicated to the master NE where the alarms may be processed and correlated by the master NE. Another current approach is to configure the OSS to correlate all the alarms from the physical NEs to present a logical view of all the alarms to the user. Such current approaches present disadvantages.

For example, the current master NE approach may require significant development effort and may consume considerable processor power at the OSS. The current OSS approach may require the OSS to be aware of NE implementation details requiring synchronization of upgrades between the OSS and multiple NEs in the network, imposing support for backward compatibility as either the OSS or an NE may require an upgrade, such as a firmware or software upgrade. The current OSS approach consumes considerable processing cycles as well as development resources to implement. Further, alternative current approaches may suppress alarms at the NEs, resulting in undesirable behavior where there are silent failures in the network.

Embodiments disclosed herein may reduce implementation complexity as compared to current approaches and may consume fewer processing cycles at an OSS. As described below, embodiments disclosed herein may introduce an additional provisionable parameter to each port of each NE, thereby enabling a user to configure the port in an internal connection mode or normal connection mode. It should be appreciated that a port of an NE may be any suitable type of physical port, such as a copper or optical port, or any suitable type of virtual port. Defects detected by NEs may be collated and integrated, and physical NEs may be configured to announce alarms to an OSS after modifying an alarm condition type. As such, an alarm may occur normally except that an NE may be configured to provide details in an alarm/trap to indicate that the defect should be asserted as an internal connection problem or as an endpoint problem based on the provisionable parameter.

Embodiments disclosed herein enable a user to provision ports of nodes of a virtual node as operating in accordance with an internal connection mode or a normal connection mode. Ports may be configured to operate in accordance with a normal connection mode by default. If configured as operating in accordance with an internal connection mode, embodiments disclosed herein may enable a user to configure the port as a master or a slave. Alternatively, master and slave designations may be negotiated between the ports using any suitable protocol. Master-slave negotiation may be initiated, for example, when an active link is detected. Embodiments disclosed herein may enable a user to configure a port as a master, slave, or enables the nodes to negotiate the master or slave designation.

FIG. 1A is block diagram 100 of a virtual node 102 in operative communication with an Operational Support System (OSS) 112 and second nodes 108a and 108b. The virtual node 102 may include first nodes 104a-c that may be multiple physical network elements (NEs). The first nodes 104a-c may have multiple physical ports 106a-f. Physical ports may be Ethernet, SONET, or other suitable interface. The OSS 112 is configured to communicate with first nodes 104a-c, such as by sending provisioning commands, submitting queries, etc. 116.

Embodiments disclosed herein may enable disparate network elements to appear as a single network element. For example, the virtual node 102 may be configured to appear as a single node, such as a single virtual NE, having internal facilities 110a and 110b defined as connections between ports of the first nodes, such as internal facility 110a between ports 106c and 106e or internal facility 110b between ports 106d and 106f.

A second node, such as 108a or 108b, may be NEs operatively coupled to the virtual node 102 via external facilities 114a or 114b. The virtual node 102 may generate alarms 118 at a master port of ports 106c or 106e of the internal facility 110a, or at a master port of ports 106d or 106f of the internal facility 110b, and at ports 106a and 106b of the external facilities 114a or 114b. The virtual node 102 may report the alarms 118 generated to the OSS 112.

Figure 1B:
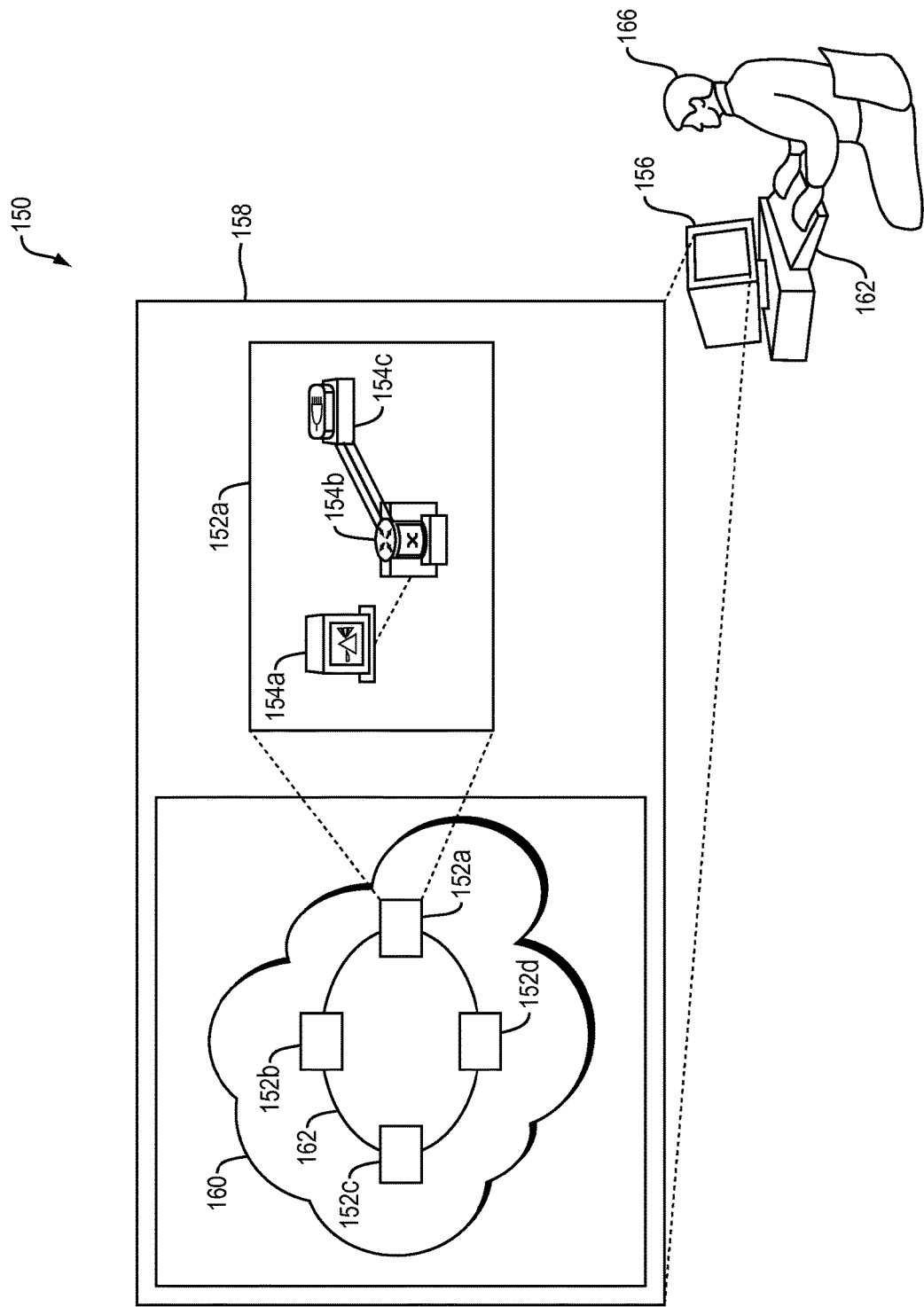
FIG. 1B is a block diagram of a user provisioning an Optical Transport Network (OTN) at a user interface of a network management platform.

FIG. 1B is a block diagram 150 of a user 166 provisioning an Optical Transport Network (OTN) 160 at a user interface 162 of a network management platform 156. The OTN network 160 is an example of a network; however, embodiments disclosed herein may be applied to any suitable network. The OTN network 160 includes a Dense Wavelength Division Multiplexing (DWDM) ring 162, such as a DWDM 100G ring, that includes multiple logical NEs 152a-d. The DWDM ring 162 may carry voice traffic, high-bandwidth data, video services, or any other suitable data. The multiple logical NEs 152a-d may each be single virtual NEs that comprise multiple physical NEs, such as first nodes 154a-c shown for the single virtual NE 152a on the display 158. For example, the user 166 may have provisioned the multiple logical NEs 152a-d as including multiple physical NEs, as shown in the example for NE 152a.

The first nodes 154a-c may be physical NEs each with a different function. For example, the first node 154a may be an optical transport platform with functions including Time Division Multiplex (TDM) switching, Add/Drop Multiplexing (ADM), and DWDM transport. The first node 154b may be a hub shelf for switching or aggregating data between the optical transport platform 154a and a multiplexing node 154c that may provide multi-wavelength optical add/drop, integrated SDH, and open transponder interfaces. As part of the network provisioning, embodiments disclosed herein may enable the user 166 to provision multiple physical network elements, such as the first nodes 154a-c, configured to appear as the virtual node 152a that appears as a single network element. It should be understood that the OTN network 160, DWDM ring 162, and functions of first nodes 154a-c described herein are examples, and that embodiments disclosed herein may be applied to any suitable type of network or network element implementing any suitable function in the network.

According to embodiments disclosed herein, by presenting the multiple physical NEs, such as the NEs 104a-c of FIG. 1A or the NEs 154a-c of FIG. 1B, as a single entity, such as the virtual node 102 of FIG. 1A, or the virtual NEs 152a-d of FIG. 1B, the alarm conditions of ports of the multiple physical NEs within the virtual NE may be treated as internal connection alarms of the single entity.

For example, turning back to FIG. 1A, according to one embodiment, a master port of the ports 106c and 106e may collate alarm conditions for the ports, integrate the alarm conditions collated, and report the alarm conditions collated and integrated as a single alarm for an internal connection, such as the internal facility 110a of the virtual node 102. Instead of raising alarms at both of the ports 106c and 106e for a given failure of the internal facility 110a, the master port (e.g., port 160c) of ports 106c and 106e may raise a single alarm for the internal facility 110a based on the alarm conditions of the ports 106c and 106e collated and integrated.

Figure 2A:
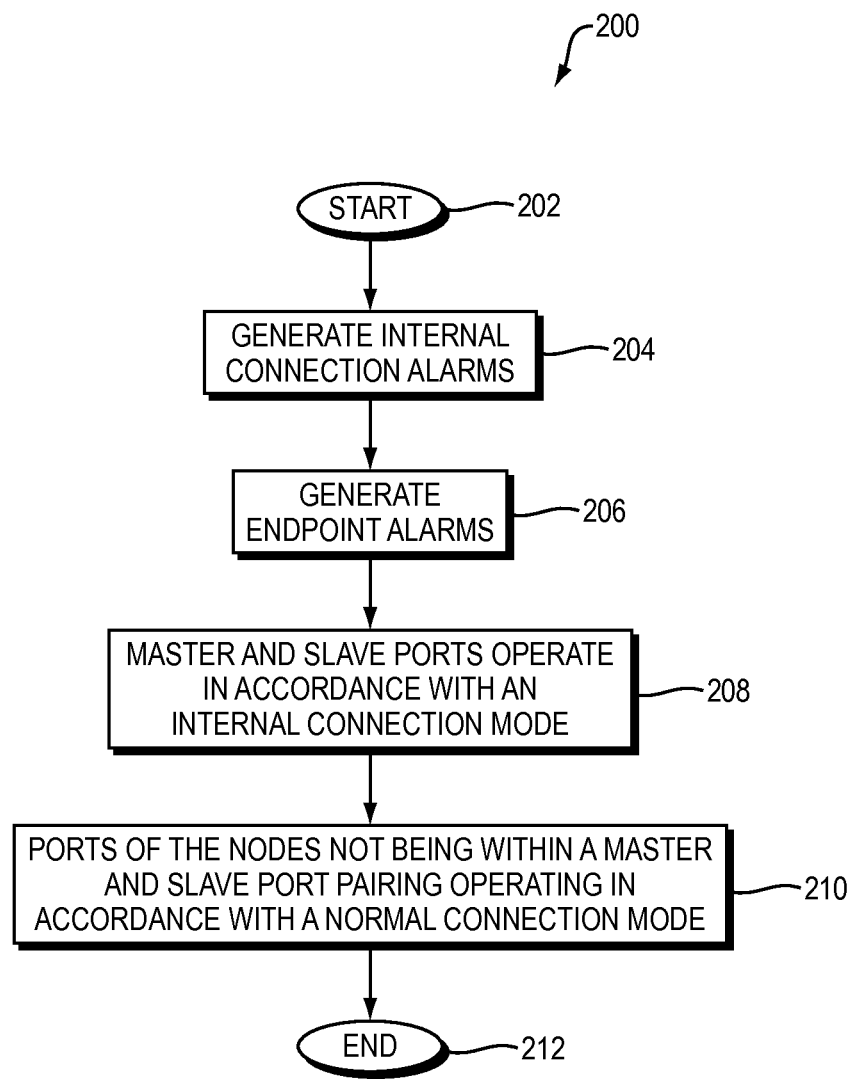
FIG. 2A is a flow diagram of an example embodiment of a method of providing alarms in a network.

FIG. 2A is a flow diagram (200) of an example embodiment of a method of providing alarms in a network. The method may begin (202) and generate internal connection alarms for a virtual node at master ports of pairs of master and slave ports of nodes configured to appear as the virtual node (204) and generate endpoint alarms at ports of the nodes not being within a master and slave pairing (206). The method may include master and slave ports operating in accordance with an internal connection mode (208) and ports of the nodes not being within the master and slave port pairing operating in accordance with a normal connection mode (210). The method thereafter ends (212) in the example embodiment.

Embodiments disclosed herein may enable a user to provision a single virtual NE, such as the virtual node 102 of FIG. 1A, or the virtual NEs 152a-d of FIG. 1B, to include multiple physical NEs, such as NEs 104a-104c of the virtual node 102 or 154a-c of the virtual NE 152a. Embodiments disclosed herein may provide a mode provisioning parameter enabling the user, such as the user 166 of FIG. 1B, to specify a port's mode as being in an internal connection mode or a normal connection mode. The user may specify the internal connection mode by setting the port as an internal port and may specify the normal connection mode by specifying the port as an external port. Ports may have a default mode that may default to the normal connection mode.

If a port's mode is provisioned as an internal connection mode, the port's alarm conditions may be communicated to a master port instead of being raised on the (slave) port itself. The master port may integrate the alarm conditions communicated with alarm conditions of the master port. The master port may collate all of the alarm conditions and integrate the alarm conditions into one or more alarms by applying alarm hierarchical rules. For example, the master port may be an optical port and the master port's transmitter may malfunction. As a result, the peer port (i.e., slave port) operatively coupled to the master port may communicate a Loss of Signal (LOS) alarm condition to the master port. The master port may be operatively coupled to a sensing device that determines transmission power of the optical port. A transmit power low alarm condition may be present on the master port based on the power sensed by the sensor. The transmit power low alarm condition of the master port may be collated with the LOS alarm condition of the slave port and integrated to form an alarm condition that may be mapped to an internal connection alarm type. As such, alarm conditions such as transmit power low and LOS, or any other suitable alarm condition, may be detected normally. However, the port's mode provisioning for whether or not the port is in an internal connection or normal connection mode would govern the manner in which the alarm condition is communicated, reported, and presented.

Figure 2B:
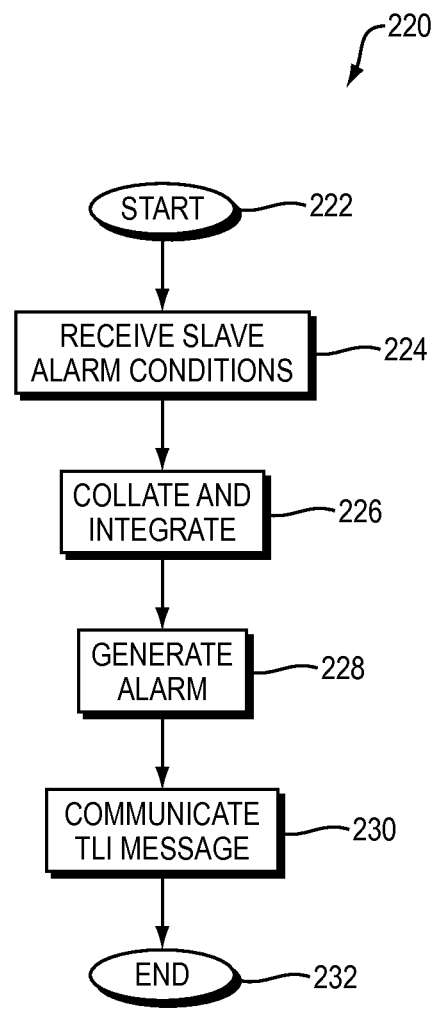
FIG. 2B is flow diagram of another embodiment of a method of providing alarms in a network.

FIG. 2B is flow diagram of another embodiment of a method of providing alarms in a network (220). The method may begin (222) and a master port may receive slave alarm conditions provided by a slave port operatively coupled to the master port (224). The method may collate and integrate the slave alarm conditions received with alarm conditions of the master port (226). The method may generate alarms at the master port including mapping the alarm conditions collated and integrated to an internal connection alarm at a facility layer (228). The method may communicate a TL1 message indicating the internal connection alarm as being asserted at the virtual node, wherein operating in accordance with a normal connection mode may include communicating the TL1 message indicating the endpoint alarm as being asserted at a port of the virtual node (230), and the method thereafter ends (232) in the example embodiment.

According to another embodiment, the method may provision a subset of ports of the nodes as internal ports. For each internal port of the subset, the method may operatively couple the internal port to another internal port forming an internal port pairing. The method may provision one port of each internal port pairing as a master port. At each master port provisioned, the method may collate and integrate alarm conditions associated with a given defect of a connection between ports of the internal port pairing. Generating internal connection alarms at the master port may include mapping the alarm conditions collated and integrated to an internal connection alarm for the virtual node.

Provisioning one port of each internal port pairing as the master port may include negotiating a master and slave settings between ports of the internal port pairing.

According to another embodiment, the method may provision a port facility parameter at ports of the nodes of the virtual node to provide knowledge of whether each port is configured to operate in accordance with the internal connection mode or the normal connection mode. The method may present an alarm associated with at least one alarm condition of a given port as a port type alarm or an internal connection type alarm based on the port facility parameter provisioned.

The nodes configured to appear as the virtual node may be different network device elements each providing different functions and presented to a user as the virtual node. Alternatively, the nodes may have same functions or a subset of the node may be same or different functions.

Generating alarms may include raising and clearing alarms. Ports of the nodes configured to appear as the virtual node may be physical ports on linecards of the nodes. Internal connection alarms generated may be triggered by a failure on a physical cable or port misconfiguration.

The internal connection alarms or endpoint alarms generated may include an alarm condition type known to layers above a facility layer.

Figure 2C:
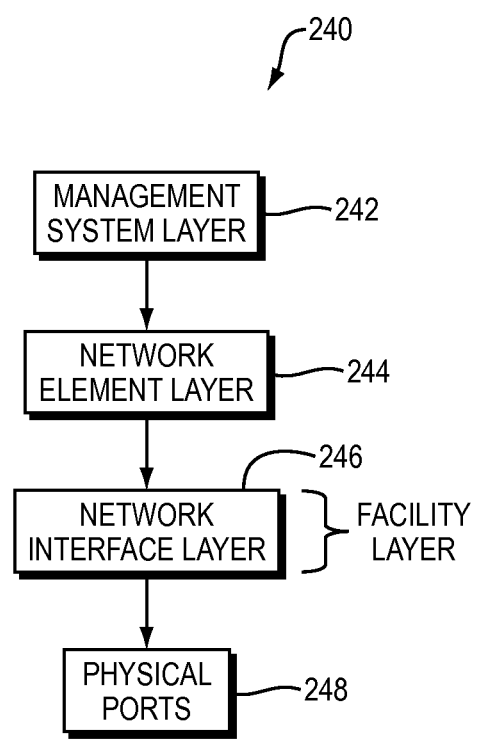
FIG. 2C is a block diagram of layers that may manage alarms.

FIG. 2C is a block diagram of layers that may manage alarms (240). Layers may include a network interface layer 246 (i.e., a facility layer) that manages physical ports 248, a network element layer 244 that manages functions of the network element on which the physical ports 248 reside, and a management system layer 242 that may provision and configure network elements and present alarms reported by the network element layer 244.

Figure 2D:
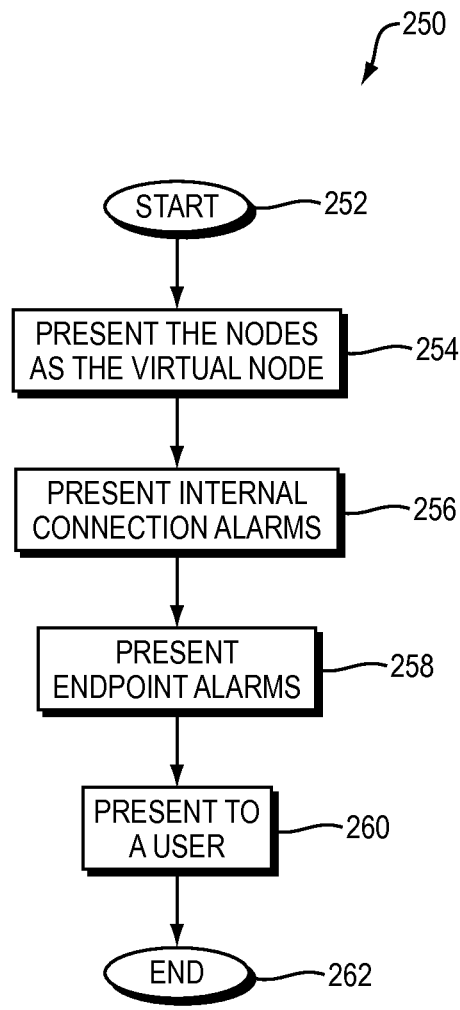
FIG. 2D is a flow diagram of another embodiment of a method of providing alarms in a network.

FIG. 2D is a flow diagram of another embodiment of a method of providing alarms in a network (250). The method may begin (252) and present the nodes as the virtual node (254). The method may present internal connection alarms generated at each master port as internal connection alarms of the virtual node (256). The method may present endpoint alarms generated as port alarms of the virtual node (258).

Presenting may include presenting to a user via a user interface (260) and the method thereafter ends (262) in the example embodiment.

The method may collate and integrate alarm conditions at each master port of pairs of master and slave ports of the nodes configured to appear as the virtual node. The method may map the alarm conditions collated and integrated to an internal connection alarm. The method may communicate the internal connection alarm in association with the single node to a Network Management System (NMS) in a manner obviating alarm processing at the NMS in an event a defect on a connection between ports of the nodes is detected. For example, communicating alarm conditions as internal connection alarms using TL1, an NMS may handle the alarms without parsing (e.g., processing) the alarm content, whereas communicating endpoint alarms may involve parsing the alarm content.

Figure 2E:
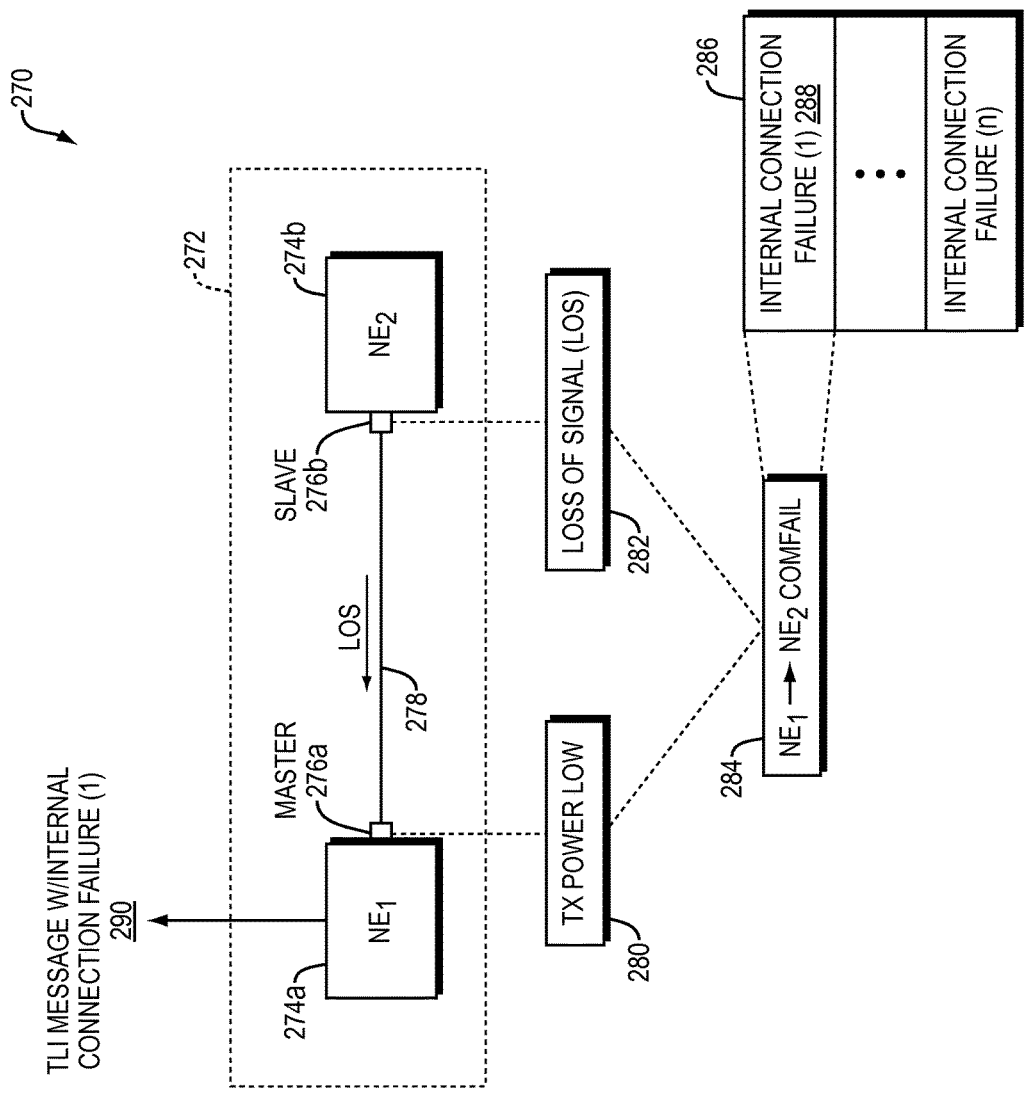
FIG. 2E is block diagram of an example mapping of alarm conditions collated and integrated to an internal connection alarm.

FIG. 2E is block diagram of an example mapping of alarm conditions collated and integrated to an internal connection alarm (270). A virtual node 272 may include nodes 274a and 274b that may be physical NEs with different functions. The port 276a may be a master port of the ports 276a and 276b of the nodes 274a and 274b. The virtual node 272 may have an internal facility 278 that is a connection between ports 276a and 276b of the nodes 274a and 274b. The master port 276a may have a low transmit power alarm condition 280 on the master port 276a. The slave port (i.e., peer port) may have an LOS alarm condition 282 that may be due to the transmit power of an optical laser at the master port 276a being low. The transmit power alarm condition 280 of the master port may be collated with the LOS alarm condition 282 and integrated as an internal communication alarm 284 in a direction from the NE 274a to the NE 274b. The NE 274a may map the alarm conditions collated and integrated by mapping the internal connection alarm 284 to at least one of multiple internal connection failures 286 defined and stored. Mapping may utilize mapping tables (not shown), pointers, or other suitable mapping mechanism. In the example of FIG. 2E, the internal connection alarm 284 may be mapped to an internal connection failure 288 that may communicated to a network platform (not shown) from the NE 274a via a TL1 message 290.

Figure 3:
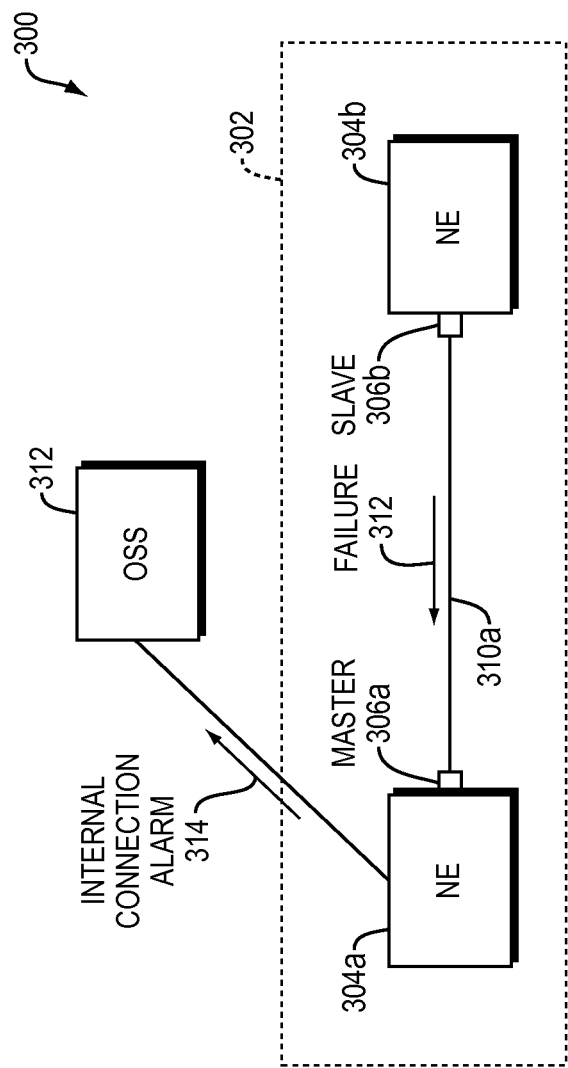
FIG. 3 is a block diagram of another embodiment of a virtual node.

FIG. 3 is a block diagram of another embodiment of a virtual node 302. The virtual node 302 may include first nodes 304a and 304b that may be NEs with different functions. The port 306a may be a master port of the ports 306a and 306b of the first nodes. The virtual node 302 may have an internal facility 310a that is a connection between ports 306a and 306b of the first nodes 304a and 304b. A failure 312, such as an alarm condition on the port 306b, may be communicated to the master port 306a. Alarm conditions may be communicated to the master port in any suitable manner using any suitable signaling or protocol. Ports 306a and 306b may be provisioned as internal ports. Port 306a may be configured as the master port of the pair of master and slave ports. Ports 306a and 306b may be provisioned as internal ports and may have negotiated port 306a as the master port and port 306b as the slave port.

The master port 306a may collate alarm conditions of the master port 306a with the port 306b, integrate the alarm conditions collated, and raise an alarm, such as an internal connection alarm 314, on the internal facility 312 of the virtual node 302. Alarm conditions of the NEs 304a and 304b may be detected in any suitable manner. The NE 304a of the virtual node 302 may map the alarm conditions collated and integrated to the internal connection alarm 314 because the port 306a has been configured as an internal port and further provisioned as a master port. According to one embodiment, the internal connection alarm 314 may be communicated to an OSS 312 with a TL1 message.

As defects are detected and integrated, the physical NEs of the virtual node 302 may announce the alarm after modifying the condition type. As such, the alarms may be detected normally except that a facility layer, such as the facility network interface layer 246 or FIG. 2C, of the NE may provide details indicating to a higher layer that the facility being alarmed is an endpoint or an internal connection based on a provisionable parameter, such as an internal or external port provisioning parameter. Embodiments disclosed herein enable a distributed management approach with respect to the functions of the ports at the facility layer. The distributed approach enables scaling of alarms.

For example, internal connection alarms that are communicated to an OSS may be displayed by the OSS without processing the alarms, reducing requirements for compute power at the OSS, reducing memory requirements needed for each alarm, thus, providing a more scalable approach to alarm management. Alarms sent from the NE specified as an internal connection alarm need not be processed (e.g., parsed or massaged) by the OSS, the alarm may simply be processed "as is" by the OSS. The OSS need only be configured such that it is aware of the new TL1 alarms being introduced. Embodiments disclosed herein may define new TL1 alarms that an OSS interface may be made of aware of enabling the new TL1 alarms to be presented to a user. The new TL1 alarms may not require any additional processing at higher layers presenting the alarms, thereby reducing complexity of the upper layers.

Embodiments disclosed herein enable a distributed approach with respect to the functions of the ports at the facility layer. The distributed approach may be beneficial as it may distribute management functions to a processor of a line card including the ports, increasing scalability as alarms (e.g., LOS on an internal cable) may be reported directly to the OSS (NMS) or a master network element, but the OSS (NMS) or master network element does not need to process the alarms. Further, embodiments disclosed herein may distribute management functions of a controller, such as an OSS, that manages each port. The management functions of the controller may be distributed to processors of line cards of the multiple network elements.

When multiple products are in use in a network, such as a complex telecom or datacom network, use of the management of the multiple products may be difficult as multiple alarms may be raised. Embodiments disclosed herein may enable a more enjoyable user experience when using and managing multiple network elements in a complex network by enabling a subset of the multiple network elements to be treated as single device, the virtual node. By managing alarms in a manner that enables a user to manage the alarms at an internal interface rather than an external interface, users may resolve issues in the network in a more efficient manner.

Figure 4:
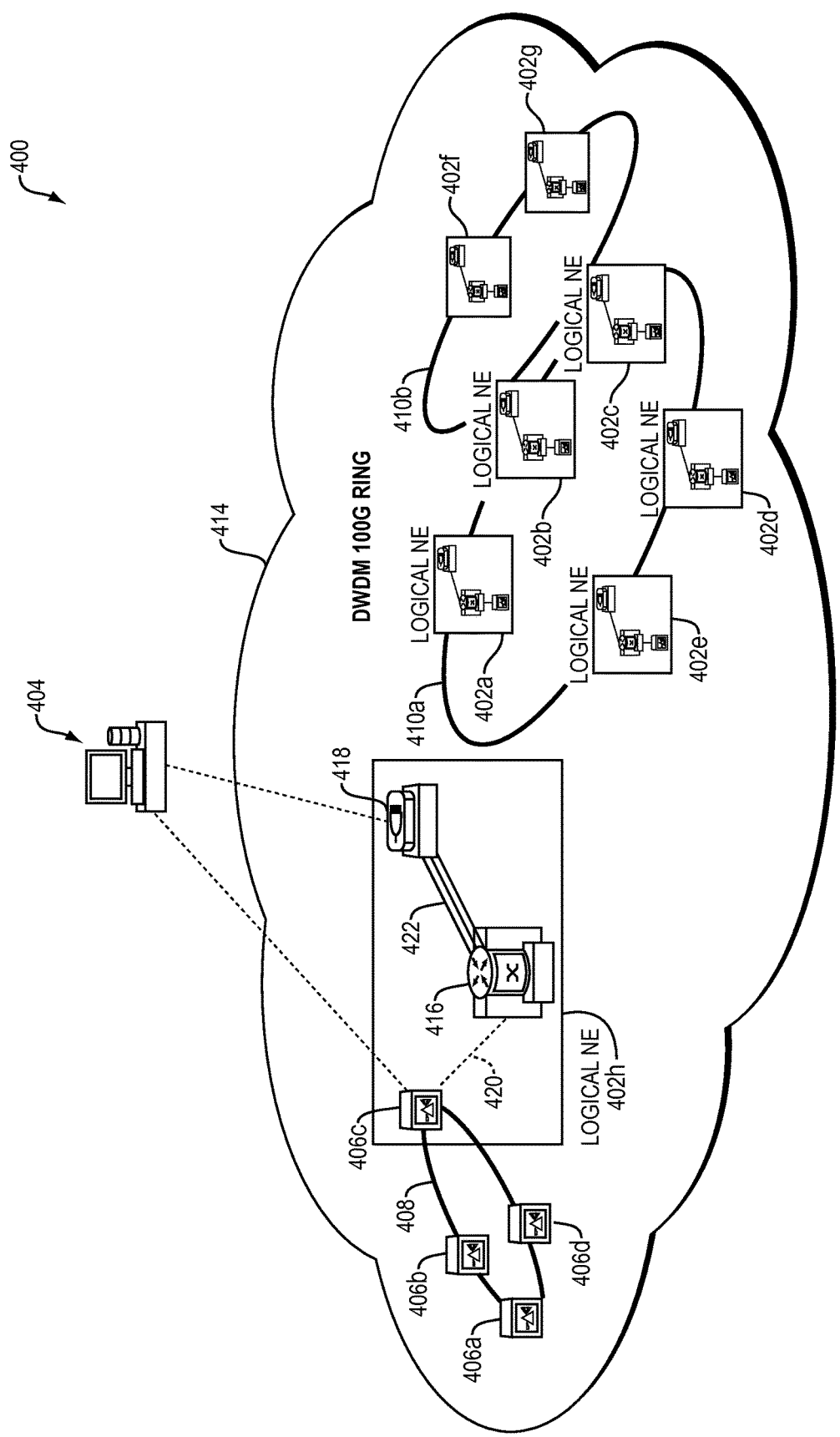
FIG. 4 is a block diagram of an example network topology in which embodiments disclosed herein may be implemented.

FIG. 4 is a block diagram of an example network topology 400 in which embodiments disclosed herein may be implemented. The network topology 400 includes an Optical Transport Network (OTN) 414 that may be provisioned and managed by a network management system (NMS) 404 (also referred to herein as an OSS). The OTN 414 may include network elements, such as optical transport systems (OTS) 406a-d. The OTSs 406a-d may be configured as shelves including service modules, power feeds, fiber troughs, fans and management connections. The OTSs 406a-d may integrate Ethernet switching and optical network technologies. OTSs 406a-d may be organized in a ring included in the OTN 414.

The OTN 414 may also include multiple DWDM rings, such as 100G DWDM rings 410a or 410b. The DWDM rings 410a and 410b may include multiple logical network elements, such as logical NEs 402a-g. The logical NEs 402a-g may be virtual nodes including first nodes, such as the NEs OTS 406c, hub shelf 416, and multiplexing node 418 that may provide multi-wavelength optical add/drop, integrated SDH, and open transponder interfaces for operatively coupling to the DWDM ring 410a or 410b. The ports of the NEs 406c, 416, and 418 that are operatively coupled via connections 420 or 422 may be provisioned by a user as internal ports at the NMS 404. Ports (not shown) of NE 406c that operatively couple to other network elements (e.g., 406b and 406d) on the ring 408, and ports (not shown) of NE 418 that operatively couple to network elements (e.g., 402a and 402e) of the DWDM ring 410a may be provisioned as external ports, or ports operating in accordance with a normal connection mode. As such, ports provisioned as internal ports may operate in accordance with an internal connection mode and may have alarms generated at a master port of the internal ports that may generate the alarm on an internal connection, such as 420 or 422, and report the internal connection alarm to the NMS 404 as being asserted on the logical NE 402h.

Embodiments disclosed herein enable all alarms, such as alarms due to improper configuration or cabling, to be presented to a user at a user interface, such a user interface of the NMS 404 that may be configured to present multiple network elements, such as 406c, 416, and 418, as a single network element, such as the logical NEs 402a-h that may be managed by a user with reduced complexity as opposed to individual element management. By integrating multiple network devices in a manner that presents the multiple network devices as a single device, users need only deal with management, provisioning, and alarms related to the single device, the virtual node.

If a given alarm, such as an LOS alarm, or other suitable alarm condition, is detected at a port, embodiments disclosed herein may alarm an internal connection providing a specialized message enabling a network element to pass the specialized message along to an OSS alleviating the OSS from expending cycles for processing the alarm, such as cycles expended to parse or manipulate the message, because the specialized message indicates the alarm as being an internal connection alarm.

Embodiments disclosed herein may reduce a number of alarms, for example a bidirectional cable failure may raise a single alarm on the single network element instead of raising an alarm on the two ports of two network elements operatively coupled via the cable having the bidirectional failure. As such, a number of alarms being raised and presented to the user may be reduced, thus, complexity for troubleshooting may be reduced for a user, such as a NOC engineer, as a number of tickets being generated for the alarm may be reduced.

Embodiments disclosed herein may reduce a number of alarms in a network and may present alarms as cable alarms instead of port alarms. Alarms may be shown to a user as an internal connection alarm instead of an endpoint alarm. Internal failures may be shown as module type failures. Embodiments disclosed herein may map external type failures, such as an alarm condition on a port, to an internal connection alarm. The internal alarm mapping may be performed at a layer detecting the alarm. The alarm may be generated by a lower layer in a manner enabling an alarm message to be passed up to a higher layer, such as an OSS, that may present the alarm to the user without processing of the alarm.

Embodiments disclosed herein enable a master port of ports to collate alarm conditions and generated an internal communication that notifies a controller to generate a message, such as a TL1 message, and send the message to an OSS (e.g., NMS) that may present the alarm to a user on a user interface without the OSS having to incur the complexity of processing the message. Network elements included in the virtual node may each have a controller that may send TL1 messages to an OSS. Alternatively, a single network element in the virtual node may serve as a controller receiving messages communicating internal connection alarms and generating TL1 messages to send to the OSS.

Embodiments disclosed herein may enable a vendor to bundle multiple network elements and sell them as a single package to a network carrier. The network carrier may manage the multiple network elements as a single network element, the virtual node. For example, a network element, such as a DAC that provides grooming at a high level, may be bundled with a network element, such as a DT that provides granularity of grooming at a low level. The multiple network elements may be deployed at a single location and managed as a virtual node. Another example embodiment may be a network element, such as a DWDM network element, that may be operatively coupled with an OTN network element.

According to another embodiment, a node may be configured with at least one other node to appear as a virtual node to provide alarms in a network. The node may comprise at least one processor. The node may comprise at least one linecard including the at least one processor and multiple physical ports. The multiple physical ports may be provisioned as internal or external ports. Each provisioned internal port may be further provisioned as either a slave or master port. The at least one processor may be configured to, for each slave port provisioned, communicate alarm conditions of the slave port to a corresponding master port operatively coupled to the slave port provisioned. For each master port provisioned, the node may collate and integrate alarm conditions of the master port provisioned with alarm conditions communicated from a corresponding slave port operatively coupled to the master port provisioned. The master port provisioned may generate internal connection alarms for the virtual node based on the alarm conditions collated and integrated. For each external port provisioned, the external port provisioned may generate endpoint alarms for the virtual node. The internal facility and endpoint alarms generated may be reported.

The at least one processor may be further configured to map the alarm conditions collated and integrated to the internal connection alarms and may communicate a TL1 message indicating the internal connection alarms as being asserted at the virtual node.

The at least one processor may be further configured to provision the multiple physical ports as internal or external ports and provision the internal ports provisioned as master port or slave ports.

To provision internal ports provisioned as either master or slave ports, the at least one processor may further be configured to negotiate a master or slave setting.

The at least one processor may further be configured to provision the multiple physical ports based on a port facility parameter to provide knowledge of whether each port is configured to support an internal connection alarms or an endpoint alarms. The at least one processor may be configured to communicate an alarm associated with at least one alarm condition of a given port of the multiple physical ports as a port type alarm or an internal connection type alarm based on the port facility parameter provisioned.

The node and the at least one other node may have different functions and may be presented to a user at the virtual node.

Generating alarms may include raising and clearing alarms. Alarm conditions may be triggered by a failure on a physical cable operatively coupled to the master port or the slave port or may be triggered by misconfiguration of the master port the slave port.

The internal connection alarms generated may include an alarm condition type known to layers above a facility layer.

To integrate alarm conditions collated the at least one processor may be further configured to apply hierarchical rules to the alarm conditions.

Figure 5:
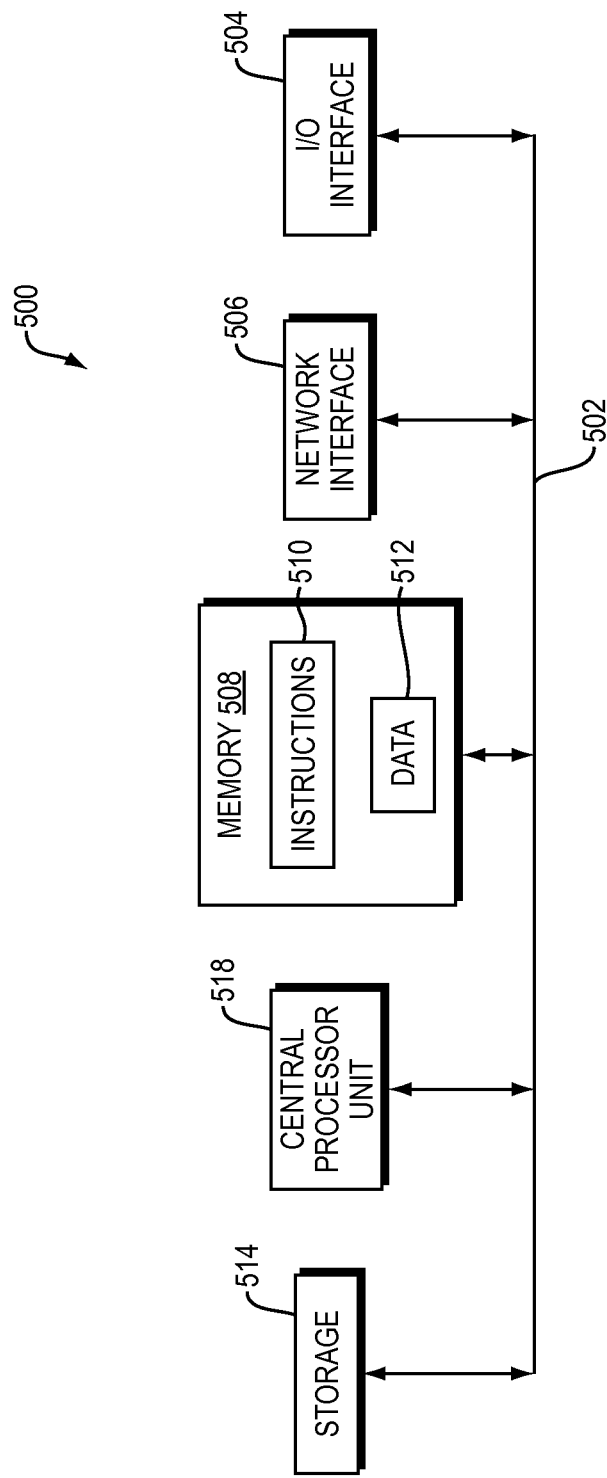
FIG. 5 is a block diagram of an example internal structure of a computer optionally within an embodiment disclosed herein.

FIG. 5 is a block diagram of an example of the internal structure of a computer 500 in which various embodiments of the present invention may be implemented. The computer 500 contains a system bus 502, where a bus is a set of hardware lines used for data transfer among the components of a computer or processing system. The system bus 502 is essentially a shared conduit that connects different elements of a computer system (e.g., processor, disk storage, memory, input/output ports, network ports, etc.) that enables the transfer of information between the elements. Operative with the system bus 502 is an I/O device interface 504 for connecting various input and output devices (e.g., keyboard, mouse, displays, printers, speakers, etc.) to the computer 500. A network interface 506 allows the computer 500 to connect to various other devices attached to a network. Memory 508 provides volatile storage for computer software instructions 510 and data 512 that may be used to implement embodiments of the present invention. Disk storage 514 provides non-volatile storage for computer software instructions 510 and data 512 that may be used to implement embodiments of the present invention. A central processor unit 518 is also operative with the system bus 502 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of providing alarms in a network, the method comprising:
    generating internal connection alarms, for a virtual node, at master ports of pairs of master and slave ports of nodes configured to appear as the virtual node; and
    generating endpoint alarms at ports of the nodes configured to appear as the virtual node and not being within a master and slave pairing, the master and slave ports operating in accordance with an internal connection mode, the ports of the nodes configured to appear as the virtual node and not being within the master and slave port pairing operating in accordance with a normal connection mode, the endpoint alarms generated as port alarms of the virtual node.

2. The method of claim 1 wherein operating in accordance with an internal connection mode includes:
    at each master port, receiving slave alarm conditions provided by a slave port operatively coupled to the master port and collating and integrating the slave alarm conditions received with alarm conditions of the master port, wherein generating internal connection alarms at the master port includes mapping the alarm conditions collated and integrated to an internal connection alarm at a facility layer and communicating a message indicating the internal connection alarm as being asserted at the virtual node, and further wherein operating in accordance with a normal connection mode includes communicating the message indicating the endpoint alarm as being asserted at a port of the virtual node.

3. The method of claim 1 further comprising:
    provisioning a subset of ports of the nodes as internal ports;
    for each internal port in the subset, operatively coupling the internal port to another internal port forming an internal port pairing, and provisioning one port of each internal port pairing as a master port; and
    at each master port provisioned, collating and integrating alarm conditions associated with a defect of a connection between ports of the internal port pairing, wherein generating internal connection alarms at the master port includes mapping the alarm conditions collated and integrated to an internal connection alarm for the virtual node.

4. The method of claim 3 wherein provisioning one port of each internal port pairing as the master port includes negotiating master and slave settings between ports of the internal port pairing.

5. The method of claim 1 further comprising:
    provisioning a port facility parameter at ports of the nodes of the virtual node to provide knowledge of whether each port is configured to operate in accordance with the internal connection mode or the normal connection mode; and presenting an alarm associated with at least one alarm condition of a given port as a port type alarm or an internal connection type alarm based on the port facility parameter provisioned.

6. The method of claim 1 wherein the nodes configured to appear as the virtual node are different network device elements each providing different functions and presented to a user as the virtual node.

7. The method of claim 1 wherein generating internal connection alarms includes raising and clearing alarms and optionally wherein ports of the nodes configured to appear as the virtual node are physical ports on linecards of the nodes and further optionally wherein generating the internal connection alarms generated is performed responsive to a failure on a physical cable or port misconfiguration.

8. The method of claim 1 wherein the internal connection alarms generated include an alarm condition type known to layers above a facility layer.

9. The method of claim 1 further comprising:
presenting the nodes as the virtual node;
presenting internal connection alarms generated at each master port as internal connection alarms of the virtual node; and
presenting endpoint alarms generated as port alarms of the virtual node, wherein presenting includes presenting to a user via a user interface.

10. The method of claim 1 further comprising:
collating and integrating alarm conditions at each master port of pairs of master and slave ports of the nodes configured to appear as the virtual node;
mapping the alarm conditions collated and integrated to an internal connection alarm; and
communicating the internal connection alarm in association with the virtual node to a Network Management System (NMS) in a manner obviating alarm processing at the NMS in an event a defect on a connection between ports of the nodes is detected.

11. An apparatus for providing alarms in a network, the apparatus configured with at least one other apparatus to appear as a virtual node, the apparatus comprising:
at least one processor; and
at least one linecard including the at least one processor and multiple physical ports, the multiple physical ports being provisioned as internal or external ports, each provisioned internal port being further provisioned as either a slave or master port, the at least one processor configured to:
for each slave port provisioned, communicate alarm conditions of the slave port to a corresponding master port operatively coupled to the slave port provisioned;
for each master port provisioned, (i) collate and integrate alarm conditions of the master port provisioned with alarm conditions communicated from a corresponding slave port operatively coupled to the master port provisioned and (ii) generate internal connection alarms for the virtual node based on the alarm conditions collated and integrated; and for each external port provisioned, generate endpoint alarms for the virtual node.

12. The apparatus of claim 11 wherein the at least one processor is further configured to map the alarm conditions collated and integrated to the internal connection alarms and communicate a message indicating the internal connection alarms as being asserted at the virtual node.

13. The apparatus of claim 11 wherein the at least one processor is further configured to:
provision the multiple physical ports as internal or external ports; and
provision the internal ports provisioned as master port or slave ports.

14. The apparatus of claim 13 wherein to provision internal ports provisioned as either master or slave ports, the at least one processor is further configured to negotiate a master or slave setting.

15. The apparatus of claim 11 wherein the at least one processor is further configured to:
provision the multiple physical ports based on a port facility parameter to provide knowledge of whether each port is configured to support internal connection alarms or endpoint alarms; and
communicate an alarm associated with at least one alarm condition of a given port of the multiple physical ports as a port type alarm or an internal connection type alarm based on the port facility parameter provisioned.

16. The apparatus of claim 11 wherein the apparatus and the at least one other apparatus have different functions and are presented to a user as the virtual node.

17. The apparatus of claim 11 wherein to generate an internal connection alarm, the at least one processor is configured to raise and clear alarms and optionally wherein the at least one processor generates internal connection alarms responsive to a failure on a physical cable operatively coupled to the master and slave ports or to a misconfiguration of the master port or the slave port.

18. The apparatus of claim 11 wherein the internal connection alarms generated include an alarm condition type known to layers above a facility layer.

19. The apparatus of claim 11 wherein to integrate alarm conditions collated, the at least one processor is further configured to apply hierarchical rules to the alarm conditions.

20. A non-transitory computer-readable medium having stored thereon a sequence of instructions which, when loaded and executed by a processor, causes the processor to:
generate internal connection alarms for a virtual node at master ports of pairs of master and slave ports of nodes configured to appear as the virtual node; and
generate endpoint alarms at ports of the nodes configured to appear as the virtual node and not being within a master and slave pairing, the master and slave ports operating in accordance with an internal connection mode, the ports of the nodes configured to appear as the virtual node and not being within the master and slave port pairing operating in accordance with a normal connection mode.

* * * * *